United States Patent
Yamamoto et al.

(10) Patent No.: US 7,804,754 B2
(45) Date of Patent: Sep. 28, 2010

(54) OPTICAL INFORMATION RECORDING/REPRODUCING METHOD

(75) Inventors: Masakuni Yamamoto, Yamato (JP); Jun Sumioka, Kawasaki (JP); Kaoru Okamoto, Ohta-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 970 days.

(21) Appl. No.: 11/464,294

(22) Filed: Aug. 14, 2006

(65) Prior Publication Data

US 2007/0050790 A1    Mar. 1, 2007

(30) Foreign Application Priority Data

Aug. 31, 2005  (JP)  ............................ 2005-251659
Sep. 1, 2005   (JP)  ............................ 2005-253542

(51) Int. Cl.
    *G11B 7/00* (2006.01)
(52) U.S. Cl. .............. 369/59.15; 369/47.17; 369/53.33; 369/59.22
(58) Field of Classification Search ................. 720/617
    See application file for complete search history.

(56) References Cited

U.S. PATENT DOCUMENTS

| | | | |
|---|---|---|---|
| 4,912,694 A | 3/1990 | Yamamoto | 369/59 |
| 4,923,766 A | 5/1990 | Hosoi et al. | 428/694 |
| 5,199,023 A | 3/1993 | Yamamoto et al. | 369/275.4 |
| 5,233,578 A | 8/1993 | Yamamoto et al. | 369/13 |
| 5,280,160 A | 1/1994 | Yamamoto et al. | 235/454 |
| 5,329,517 A | 7/1994 | Yamaguchi et al. | 369/110 |
| 5,428,586 A | 6/1995 | Kobayashi et al. | 369/13 |
| 5,517,471 A | 5/1996 | Ashinuma et al. | 369/13 |
| 5,539,718 A | 7/1996 | Hoshi et al. | 369/100 |
| 5,555,231 A | 9/1996 | Yamamoto | 369/100 |
| 5,577,017 A | 11/1996 | Yamamoto et al. | 369/110 |
| 5,581,532 A | 12/1996 | Matsumura et al. | 369/110 |
| 5,668,872 A | 9/1997 | Morishima et al. | 380/4 |
| 5,701,279 A | 12/1997 | Hoshi et al. | 369/13 |
| 5,712,840 A | 1/1998 | Matsumura et al. | 369/112 |
| 5,768,219 A | 6/1998 | Yamamoto et al. | 369/113 |
| 5,777,974 A | 7/1998 | Yamamoto | 369/112 |
| 5,786,117 A | 7/1998 | Hoshi et al. | 430/21 |
| 5,841,755 A | 11/1998 | Yamamoto et al. | 369/118 |
| 5,956,296 A | 9/1999 | Yamamoto et al. | 369/13 |
| 5,956,297 A | 9/1999 | Yamamoto | 369/13 |
| 6,104,676 A | 8/2000 | Yamamoto | 369/13 |
| 6,249,489 B1 | 6/2001 | Fujii et al. | 369/13 |
| 6,298,015 B1 | 10/2001 | Ishii et al. | 369/13 |
| 2004/0052177 A1* | 3/2004 | Maegawa | 369/47.51 |
| 2004/0165521 A1* | 8/2004 | Kayama et al. | 369/124.12 |
| 2006/0109769 A1 | 5/2006 | Yamamoto et al. | 369/103 |

FOREIGN PATENT DOCUMENTS

JP          5-128530          5/1993

* cited by examiner

*Primary Examiner*—Wayne R Young
*Assistant Examiner*—Carl Adams
(74) *Attorney, Agent, or Firm*—Fitzpatrick, Cella, Harper & Scinto

(57) ABSTRACT

In three consecutive cells consisting of a preceding cell, a center cell, and a subsequent cell, a possible change rate of the amplitude of a reproduced signal for the center cell with respect to the sum of the multiple values of the preceding and subsequent cells is obtained in advance. Then, for reproduction, the sum of the multiple values of the adjacent preceding and subsequent cells is obtained with respect to each cell. The amplitude of the reproduced signal obtained at the center cell is corrected to be closer to a reference value on the basis of the obtained change rate and sum.

9 Claims, 14 Drawing Sheets

DISTRIBUTION OF CELL CENTER VALUE: BEFORE WAVEFORM EQUALIZATION

X AXIS: SUM OF LEVELS OF PRECEDING AND SUBSEQUENT CELLS

X AXIS: SUM OF LEVELS OF PRECEDING AND SUBSEQUENT CELLS

| LEVEL OF CENTER CELL | REFERENCE VALUE | SLOPE |
|---|---|---|
| 0 | 0.866252 | −0.01911 |
| 1 | 0.770192 | −0.0187 |
| 2 | 0.672839 | −0.01827 |
| 3 | 0.583282 | −0.01786 |
| 4 | 0.506441 | −0.0175 |
| 5 | 0.437752 | −0.01718 |
| 6 | 0.372492 | −0.01686 |
| 7 | 0.315025 | −0.01657 |

RESULT OF CORRECTION USING SLOPE FOR LEVEL 7

| ISOLATION MARK (0,X,0) | CORRECTED VALUE |
|---:|---:|
| 0.88401 | 0.88399 |
| 0.785068 | 0.78399 |
| 0.684708 | 0.68399 |
| 0.592311 | 0.58399 |
| 0.512973 | 0.48399 |
| 0.441996 | 0.38399 |
| 0.374516 | 0.28399 |
| 0.315046 | 0.18399 |

RESULT OF CORRECTION OF NONLINEARITY

RESULT OF CORRECTION USING SLOPE FOR EACH LEVEL

| ISOLATION MARK (0,X,0) | CORRECTED VALUE |
|---:|---:|
| 0.86623 | 0.86623 |
| 0.770158 | 0.76623 |
| 0.672808 | 0.66623 |
| 0.583281 | 0.56623 |
| 0.506463 | 0.46623 |
| 0.437726 | 0.36623 |
| 0.372486 | 0.26623 |
| 0.315046 | 0.16623 |

RESULT OF CORRECTION OF NONLINEARITY

DISTRIBUTION OF CELL CENTER VALUE

FIG. 15C  {00000077777001007767700200077577003007747700400077377005007727700600077177007007707}

DISTRIBUTION OF CELL CENTER VALUE: BEFORE WAVEFORM EQUALIZATION

DISTRIBUTION OF CELL CENTER VALUE: AFTER WAVEFORM EQUALIZATION

OPTICAL INFORMATION RECORDING/REPRODUCING METHOD

BACKGROUND OF THE INVENTION

1. Field of the Invention

The present invention relates to optical information recording/reproducing methods for recording multilevel information by using three or more levels of information pits and/or for reproducing the recorded multilevel information. Particularly, the invention relates to an optical information recording/reproducing method that corrects for effects of intersymbol interference and/or nonlinearity on a reproduced signal obtained from an optical information medium.

2. Description of Related Art

The optical memory industry is expanding in recent years with the development of read-only compact disks (CDs) and digital versatile disks (DVDs), write-once memories made of thin metal films or dye recording materials, and ultimately, rewritable memories made of magneto-optical materials or phase change materials. Also, optical memories now have a wider range of applications from consumer products to external memories of computers.

Research and development are underway to enhance the density of recording capacity. One of techniques for reducing the size of a light spot for recording and reproducing information is to use a blue-violet light source (wavelength: 405 nm) rather than a red light source (wavelength: 650 nm). Another technique for reducing the size of the light spot is to increase the numerical aperture (NA) of an objective lens from 0.6 or 0.65 to 0.85. At the same time, multiple-valued recording/reproducing techniques that achieve higher efficiency with the same light spot size as before have been proposed.

For example, the inventor of the present invention has proposed a technique for recording and reproducing multilevel information in Japanese Patent Laid-Open No. 5-128530. The technique involves a recording method for recording multilevel information on an information track of an optical information recording medium by using a combination of the width of an information pit in the track direction and the amount of shift of the information pit in that direction with respect to a light spot for reproduction. It also involves a reproducing method for reproducing the recorded multilevel information on the basis of a correlation between a detected signal learned in advance and a detected signal obtained from the light spot.

Another example of the multiple-valued recording/reproducing techniques has been presented at the International Symposium on Optical Memory (ISOM) 2003, an international academic conference for research in the field of optical disks ("Write-once Disks for Multi-level Optical Recording", Conference Papers Fr-Po-04). The presentation is about eight-level multiple-valued recording/reproduction using a blue-violet light source (405 nm) and an optical system with an NA of 0.65, and setting the width of a region (hereinafter referred to as "cell"), which is a virtually provided recording area on an optical disk having a track pitch of 0.46 μm, and in which one information pit is recorded to 0.26 μm in the track direction.

Also, the applicant of the present invention has proposed a technique using a blue-violet light source (405 nm) and an optical system with an NA of 0.85 to reduce the size of a light spot, adapted to the multiple-valued method presented at the ISOM 2003, and thus achieving a recording density of as high as 30 Gbit/inch$^2$.

As illustrated in FIG. 17, for the selection of an information pit of eight levels, the width of a cell in the track direction (indicated by "A" in FIG. 17) is divided into 16 equal parts (16 channel bits), for example, with Level 0 being no information pit recorded, Level 1 corresponding to the width of two channel bits, Level 2 corresponding to the width of four channel bits, Level 3 corresponding to the width of six channel bits, Level 4 corresponding to the width of eight channel bits, Level 5 corresponding to the width of 10 channel bits, Level 6 corresponding to the width of 12 channel bits, and Level 7 corresponding to the width of 14 channel bits.

FIG. 18 illustrates a relationship between a light spot and information pits recorded at random on a track of an optical disk.

To increase memory capacity, the size of a cell needs to be reduced. As a result of the reduction of the cell size, as illustrated in FIG. 18, information pits 12 for two or three cells are included in a light spot 13. In FIG. 18, arrow A indicates the direction of a track 11 on the optical disk. Regions separated by dashed lines represent respective cells that are virtually provided.

Here, each cell is 0.2 μm in width while the light spot 13 is about 0.405 μm in diameter. With these dimensions, a surface density of about 1.5 times higher than a surface density of about 19.5 Gbit/inch$^2$ for a known two-valued method (e.g., 1-7 PP modulation, 2T=139 nm) can be achieved.

Next, the results of optical simulations carried out for observing a reproduced signal when the multiple-valued method is used will be described.

FIG. 19 illustrates parameters used in the optical simulations. The track pitch of an optical disk is 0.32 μm, the size of a light spot is 0.405 μm (wavelength: 405 nm, NA of an objective lens: 0.85), and the size of a cell is 0.2 μm. Different shapes as in FIG. 20 are assigned to the respective levels of an information pit illustrated in FIG. 17.

FIG. 21 shows a result of calculations of reproduced signals (the amount of reflected light) obtained by sequentially creating and assigning the combinations of three levels (the total number of combinations is 8×8×8=512) to a set of three consecutive cells, each cell being assigned one of the above-described eight levels, and moving the light spot from the first cell (preceding cell) through the second cell (center cell) to the third cell (subsequent cell).

Referring to FIG. 21, eight combinations of the levels of the three consecutive cells, (0,1,6) through (7,1,6), are shown for exemplary purposes. All cells other than these three are assigned Level 0.

In FIG. 21, the location of each of the three solid lines indicates the intensity of a reproduced signal (cell center value) when the light spot is located at the center of each cell, and the location of each of the two dashed lines indicates the intensity of a reproduced signal (cell boundary value) when the light spot is located at the boundary of one cell and its subsequent cell.

As can be seen, under the parameters described above, the cell center value of the center cell in every combination corresponds to Level 1. However, since the levels of the first cell (preceding cell) range from Level 0 to Level 7, the cell center value of the second cell (center cell) is varied accordingly. This is due to an effect of intersymbol interference. On the other hand, since the level of the second cell (center cell) is Level 1 in every combination, the cell center value of the third cell (subsequent cell) remains substantially the same regardless of the level of the first cell (preceding cell) at the left end. In other words, intersymbol interference originating from one cell has a certain effect on the cell center values of adjacent cells on both left and right sides, but has only a negligible effect on the cell center values of other distant cells. This can be intuitively understood from FIG. 18 where the light spot covers one cell and its two adjacent cells only.

FIG. 22, where the horizontal axis represents the level of the center cell, illustrates the distribution of the amplitude (normalized by the reflectance of marked and unmarked portions) of the reproduced signal for all combinations of levels recorded in three consecutive cells. In FIG. 22, distributions A through H correspond to Level 0 through Level 7, respectively.

As can be seen from FIG. 22, since the distribution of the reproduced signal for one level overlaps with those for adjacent levels, it is difficult to identify them separately with a fixed threshold. To enhance the separation of the distributions of amplitude, reproduced signals are generally subjected to signal processing, such as waveform equalization. For example, three-tap waveform equalization as illustrated in FIG. 23 is performed. In FIG. 23, T represents a time period during which a light spot moves from the center of one cell to that of its adjacent cell and "a" represents an equalization coefficient. Here, the waveform equalization is performed using the equalization coefficient "a" determined by substituting $V1=0.237$ into $a=-V1/(1+V1)$, where V1 represents an amplitude value for a cell adjacent to a cell corresponding to an isolated waveform with an amplitude of 1.

FIG. 24 shows a result of this waveform equalization. Distributions A' through H' correspond to Level 0 through Level 7, respectively. As can be seen, these distributions can be separated from each other with their respective fixed thresholds.

However, this is the result of an ideal simulation and in practice, each distribution may extend due to media noise, recording noise, system noise, or the like. This may lead to reproduction errors and reduced reproduction margins. Therefore, correction processing that can further enhance the separation of the distributions of reproduced signals is necessary.

SUMMARY OF THE INVENTION

The present invention is directed to enhancing the separation of the distributions of reproduced signals and reducing effects of intersymbol interference in multilevel information.

According to an aspect of the present invention, an optical information recording/reproducing method is disclosed for recording n-level multilevel information on an optical information recording medium with a track by forming information pits of various areas or various widths in the track direction so as to cause a reproduced signal having a multilevel amplitude to be generated. The information pits formed on respective cells of the same width are virtually provided on the track. With regard to reproducing the n-level multilevel information from the optical information recording medium, there are disclosed the steps of obtaining in advance, in three consecutive cells consisting of a preceding cell, a center cell, and a subsequent cell, a possible change rate of the amplitude of the reproduced signal for the center cell with respect to the sum of the multiple values of the preceding and subsequent cells. Also, the sum of the multiple values of the adjacent preceding and subsequent cells are obtained with respect to each cell for reproduction, the amplitude of the reproduced signal obtained at the center cell is corrected to be closer to a reference value on the basis of the obtained change rate and sum, and the multilevel information is reproduced on the basis of the corrected amplitude of the reproduced signal.

Further features of the present invention will become apparent from the following description of exemplary embodiments with reference to the attached drawings.

BRIEF DESCRIPTION OF THE DRAWINGS

FIG. 15A to FIG. 15C illustrate a reproduced signal corresponding to reference marks according to the present invention.

DESCRIPTION OF THE EXEMPLARY EMBODIMENTS

Exemplary embodiments of the present invention will now be described in detail with reference to the drawings.

Figure 1:
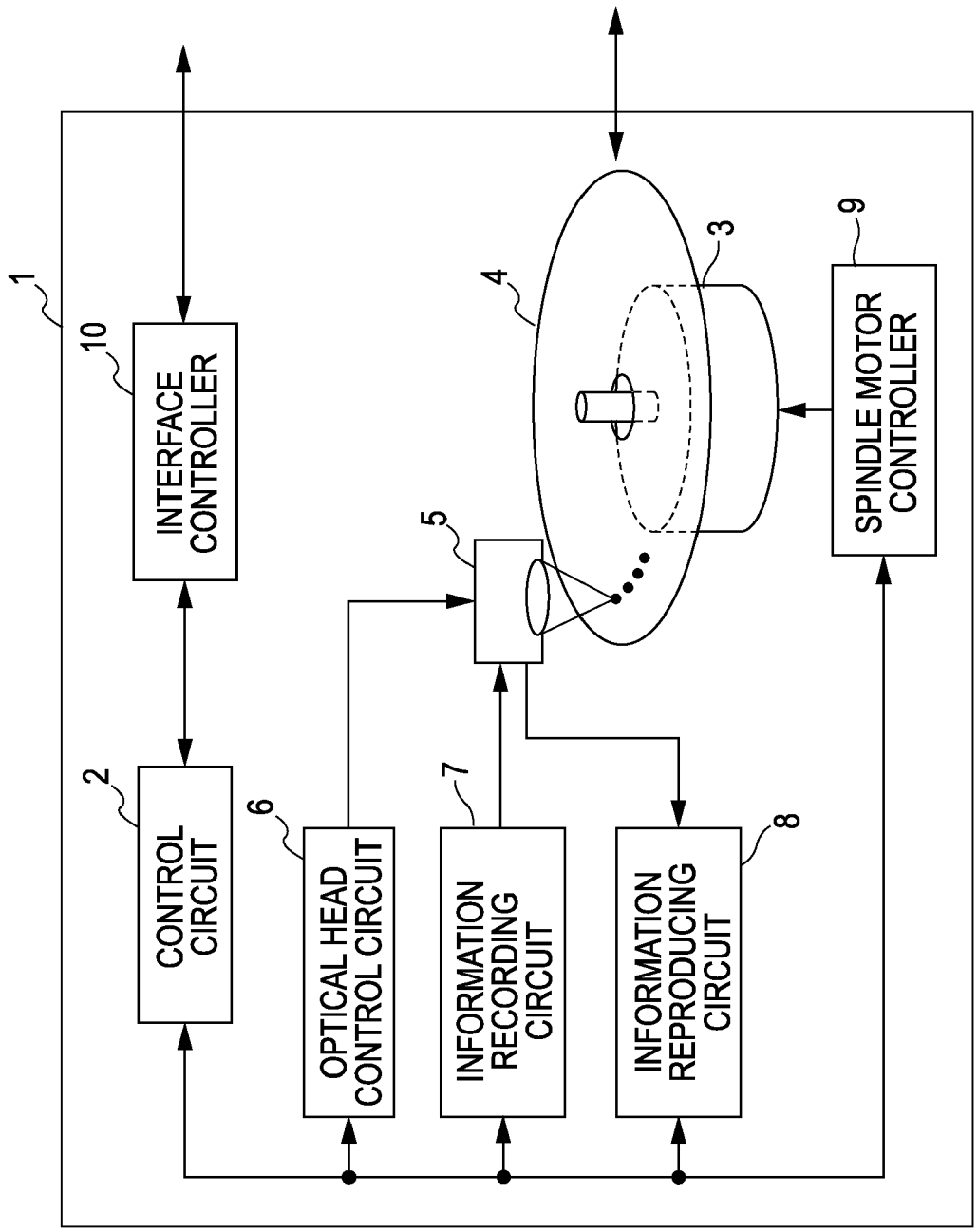
FIG. 1 is a block diagram illustrating an optical information recording/reproducing apparatus for carrying out an optical information recording/reproducing method according to an exemplary embodiment of the present invention.

FIG. 1 is a block diagram illustrating an optical information recording/reproducing apparatus for carrying out an optical information recording/reproducing method according to an exemplary embodiment of the present invention.

An optical information recording/reproducing apparatus includes a control circuit 2, a spindle motor 3, an optical disk 4, an optical head 5, an optical head control circuit 6, an information recording circuit 7, an information reproducing circuit 8, a spindle motor controller 9, and an interface controller 10.

The control circuit 2 controls the transmission of information to and from information processors, such as external computers, controls the recording of information on the optical disk 4 through the information recording circuit 7, controls the reproduction of information from the optical disk 4 through the information reproducing circuit 8, and controls other operating units. The information recording circuit 7 performs the recording of multilevel information. The information reproducing circuit 8 performs the reproduction of multilevel information.

The spindle motor 3 is controlled by the spindle motor controller 9 to cause the optical disk 4 to rotate. The optical disk 4 is an optical information recording medium inserted into or ejected from the optical information recording/reproducing apparatus 1 by a certain mechanism (not shown).

The optical head 5 optically records information on and reproduces information from the optical disk 4. For the optical head 5, as in the related art, if the wavelength of light from a light source is 405 nm and the NA of an objective lens is 0.85, the diameter of a light spot is about 0.405 μm. The track pitch of the optical disk 4 is 0.32 μm. The optical head control circuit 6 controls the position of the light spot from the optical head 5, and performs auto-tracking control, seek operation control, and auto-focusing control.

Figure 17:
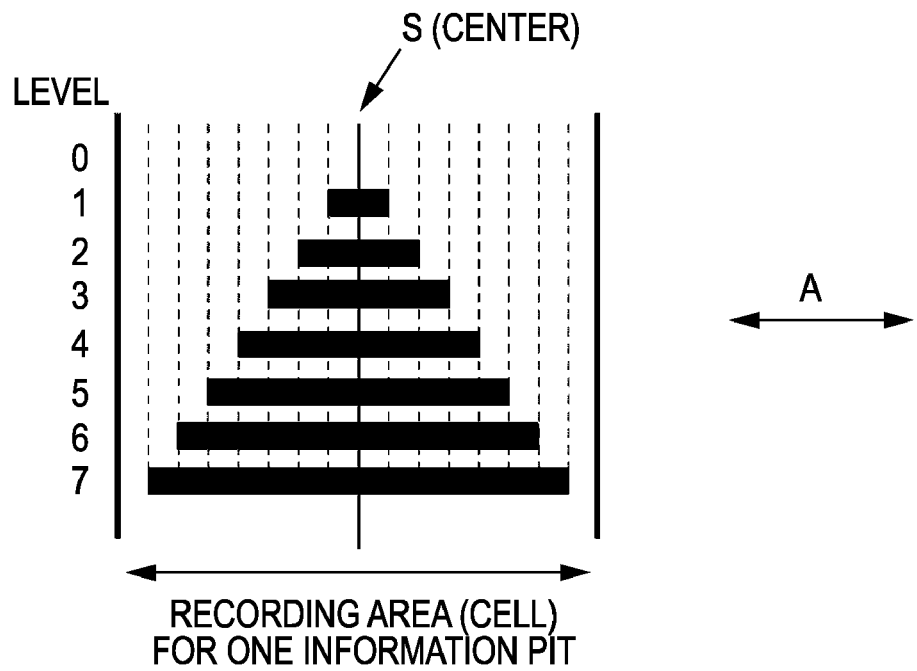
FIG. 17 illustrates a multiple-valued mark.
Figure 18:
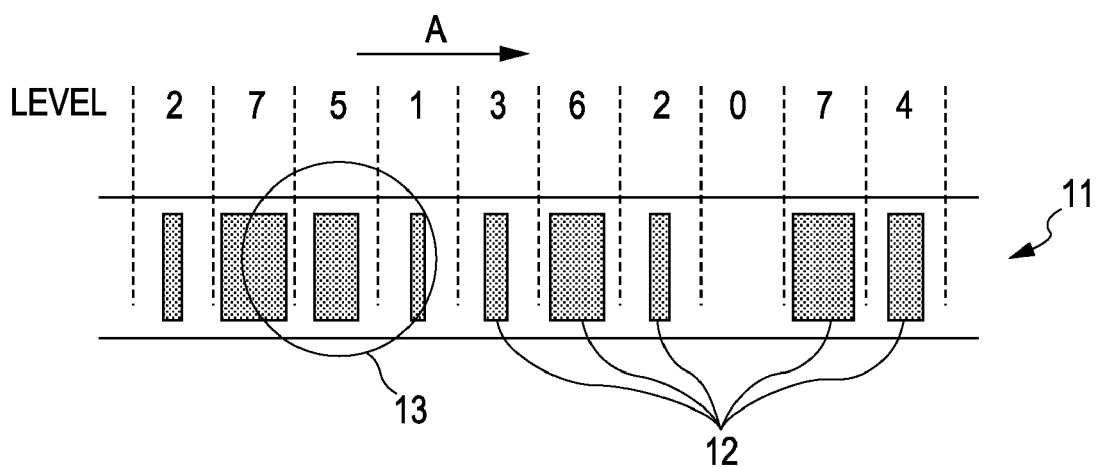
FIG. 18 illustrates a relationship between a light spot and information pits recorded at random on a track.

The width, in the track direction, of a multilevel information pit for each level, according to the present invention, is the same as that illustrated in FIG. 17.

The method of the present invention involves eight-valued recording in which three bits of information can be recorded in one cell. For example, for three bits of information, (0,0,0) corresponds to Level 0, (0,0,1) corresponds to Level 1, (0,1,0) corresponds to Level 2, (0,1,1) corresponds to Level 3, (1,0,0) corresponds to Level 4, (1,0,1) corresponds to Level 5, (1,1,0) corresponds to Level 6, and (1,1,1) corresponds to Level 7. Other ways of correspondence may also be used.

Figure 19:
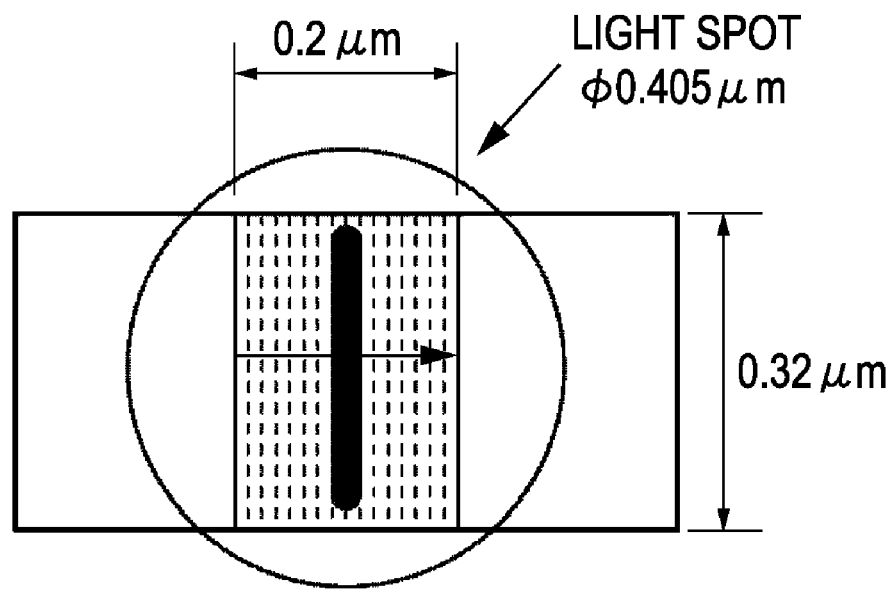
FIG. 19 illustrates parameters used in optical simulations.
Figure 20:
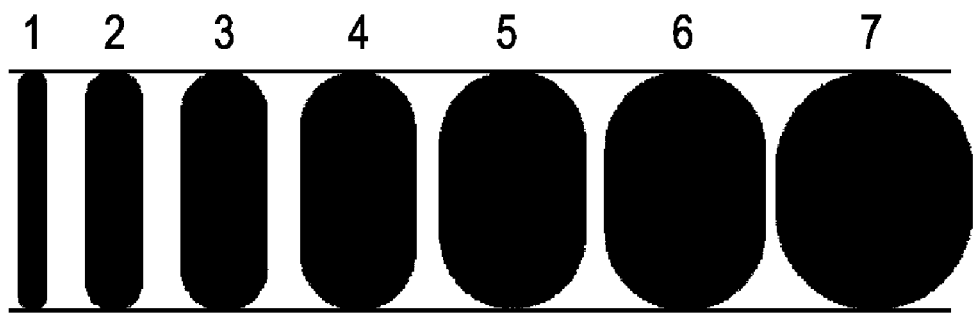
FIG. 20 illustrates the shapes of information pits used in the optical simulations.
Figure 21:
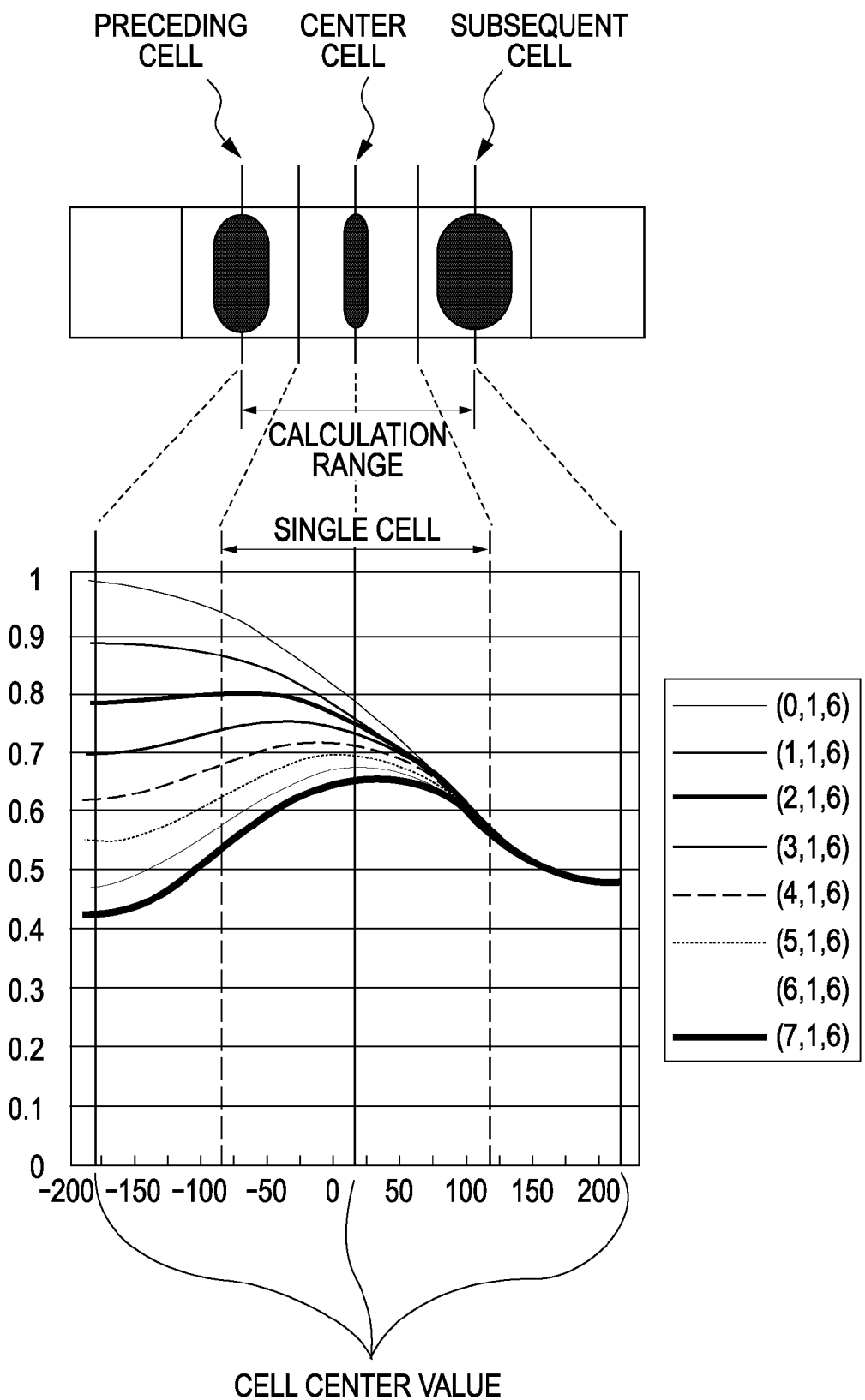
FIG. 21 shows the result of calculations in an optical simulation to illustrate reproduced signals corresponding to respective combinations of information pits recorded in three consecutive cells.

FIG. 2 to FIG. 11 show the results of optical simulations. The present invention will be described with reference to these results. Parameters used in calculations are the same as those illustrated in FIG. 19.

Figure 2:
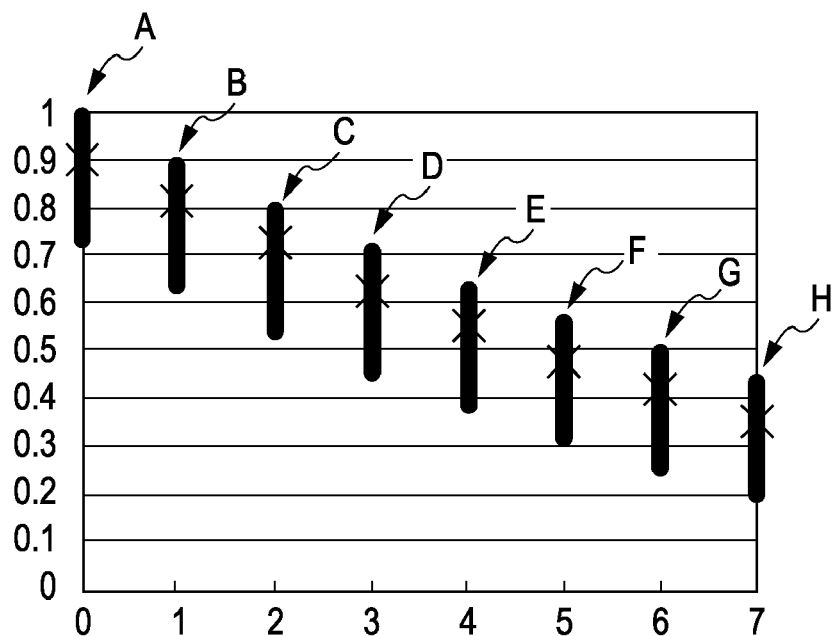
FIG. 2 illustrates characteristics of a pattern table of the present invention.
Figure 22:
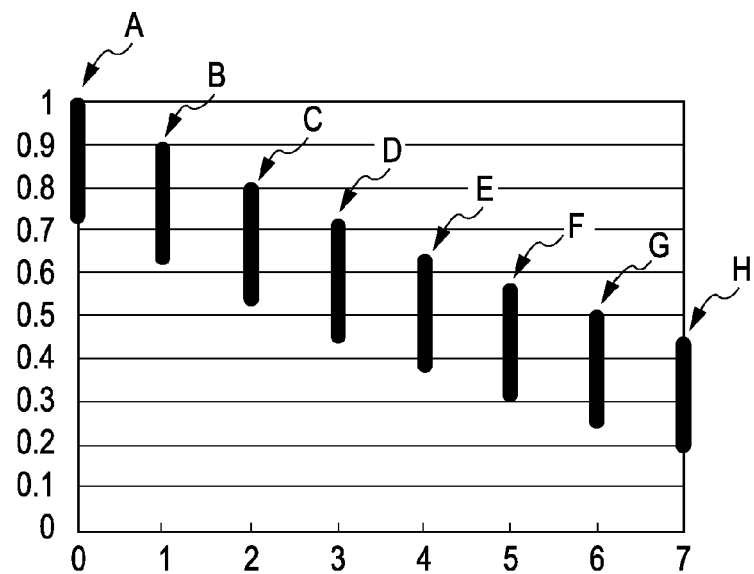
FIG. 22 is a graph showing the amplitude distributions of cell center values and having the horizontal axis representing the level of a center cell.
Figure 23:
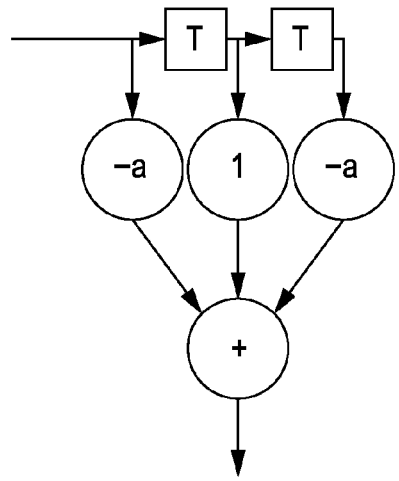
FIG. 23 illustrates three-tap waveform equalization.

Similar to FIG. 22, FIG. 2 illustrates, for all combinations of levels recorded in three consecutive cells, the distribution of the amplitude (normalized by the reflectance of marked and unmarked portions) of the reproduced signal before being subjected to waveform equalization. Again, the horizontal axis represents the level of the center cell, and distributions A through H correspond to Level 0 through Level 7, respectively. Since the amplitude distribution of the reproduced signal for one level overlaps with that for its adjacent level due to intersymbol interference, it is impossible to identify them separately with a fixed threshold.

In FIG. 2, points marked with X correspond to (3,0,2), (3,1,2), (3,2,2), (3,3,2), (3,4,2), (3,5,2), (3,6,2), and (3,7,2).

As can be seen, if the combination of the preceding and subsequent cells is consistent, the relative location of X within the distribution for one level is the same for all the other levels.

Figure 3:
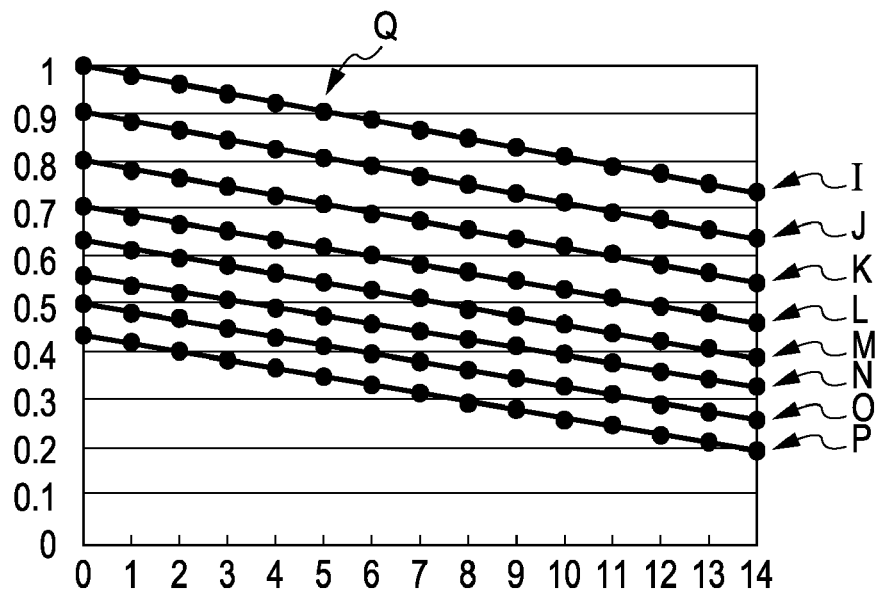
FIG. 3 illustrates characteristics of another pattern table of the present invention.

The results in FIG. 2 are re-plotted in FIG. 3, where the horizontal axis represents the sum of the levels of the preceding and subsequent cells and the vertical axis represents the reproduced signal amplitude normalized by the reflectance of marked and unmarked portions. Distributions A through H in FIG. 2 are represented by the distributions of filled circles on respective straight lines I through P. FIG. 3 shows that, in any of straight lines I through P, the same sum of the levels of the preceding and subsequent cells corresponds to substantially the same amplitude of the reproduced signal. For example, as for straight line I corresponding to distribution A (i.e., Level 0) in FIG. 2, the following combinations (0,0,5), (1,0,4), (2,0,3), (3,0,2), (4,0,1), and (5,0,0), where the sum of the levels of the preceding and subsequent cells is five in every combination, substantially overlap on the same point Q.

It can be seen, in view of the waveform equalization performed in the related art, that the straight lines obtained in FIG. 3 can be corrected to be straight lines each having a slope of 0 and passing through a point representing a specific reference value.

Figures 4, 5:
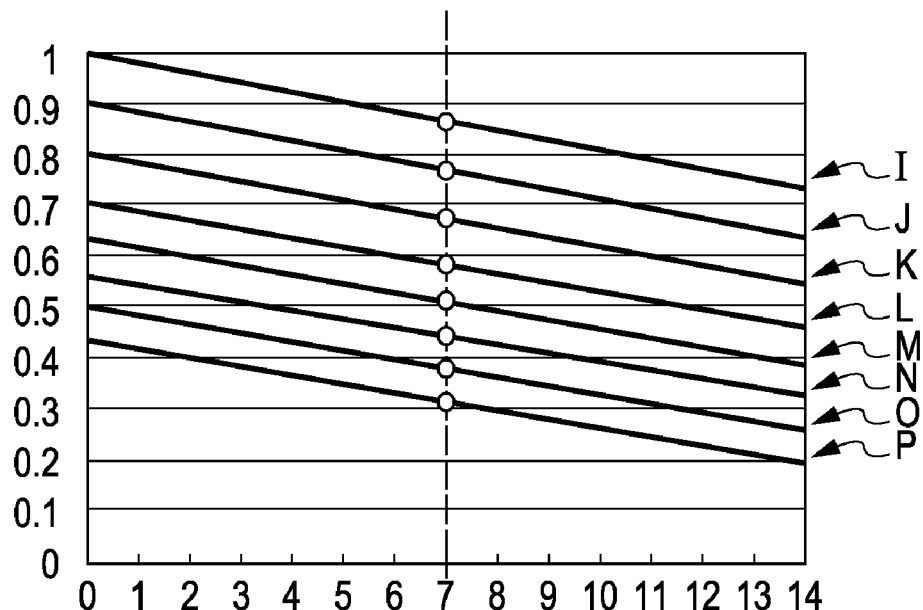
FIG. 4 shows reference values to be used in correction and reproduction according to the present invention.
FIG. 5 shows exemplary reference values and slopes to be used in correction and reproduction according to the present invention.

Specifically, in FIG. 4, reference values for the respective straight lines in FIG. 3 are set to values obtained when the sum of the levels of the preceding and subsequent cells is seven. The reference values for the respective levels are indicated by open circles and located substantially at the center of their corresponding distributions A through H in FIG. 2.

FIG. 5 shows the reference values and slopes for respective straight lines I through P (corresponding to the respective levels of the center cell). To correct a reproduced value to be a reference value, a difference between the reproduced value and the reference value is to be removed.

That is, if each straight line is given by $Y=-bX+c$ (where X is a value on the horizontal axis, Y is a value on the vertical axis, b is a slope, and c is an intercept), the value of Y, that is, $(-7b+c)$ obtained by substituting $X=7$ into $Y=-bX+c$ is a reference value for each level.

If a reproduced value is represented by S and its corresponding sum (Xs) of the levels of the preceding and subsequent cells is determined, correction is made using the following expression: $[S+\{(-7b+c)-(-Xs*b+c)\}]=[S+(Xs-7)b]$.

Figure 24:
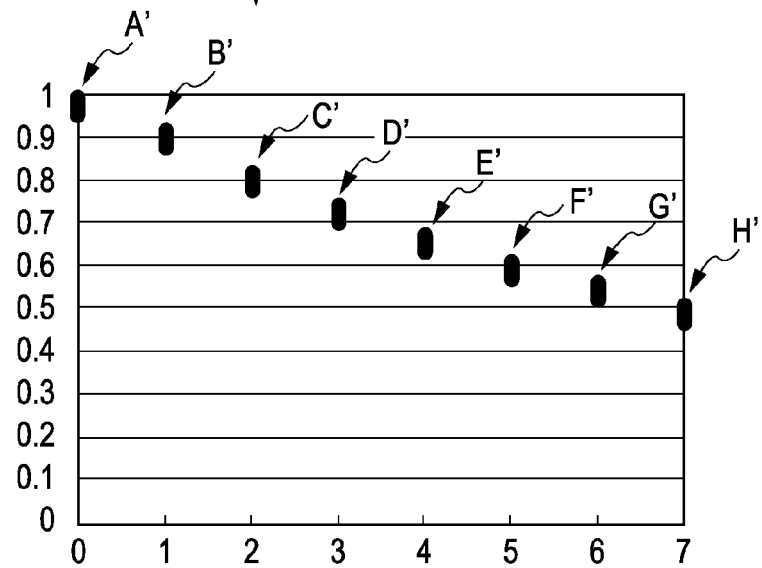
FIG. 24 shows the result of the waveform equalization.

As can be seen from FIG. 3 and FIG. 5, the slopes of eight straight lines I through P are not the same. This is an indication of nonlinearity that results when the rate of linear change in the amount of light is slowed down particularly in the cases where marks with larger widths (or areas) are involved, since the shape of a light spot varies and the amount of light decreases with distance from the center of the light spot. In addition to the slopes of the eight straight lines, the distance between adjacent straight lines decreases with proximity to the X-axis. This is another indication of nonlinearity caused by the varying shape of the light spot. These two types of nonlinearity cannot be corrected by the known waveform equalization. Even if ideal calculations are performed, the distribution for each level does not converge to a single point and the spread of the distribution, as illustrated in FIG. 24, remains.

Figures 6, 7:
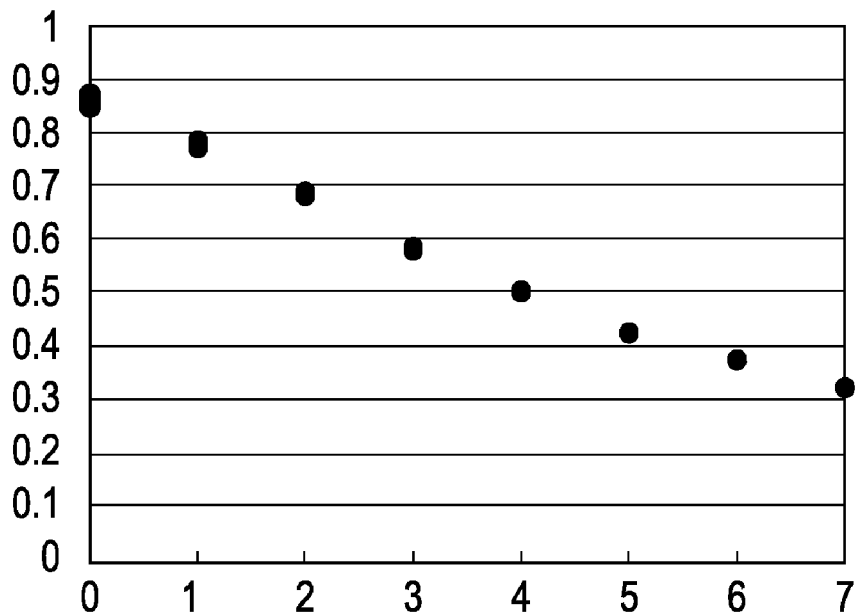
FIG. 6 shows the result of correction of effects of intersymbol interference using a slope for Level 7, according to an exemplary embodiment of the present invention.
FIG. 7 shows corrected values used in correcting nonlinearity according to the present invention.

FIG. 6 shows a result of correction in which, for example, the slope of the straight line for Level 7 was selected as a representative value to be used as a correction value coefficient. As shown, the distribution for Level 7 corresponding to the slope selected as the representative value converges to almost a single point. Even the distribution for Level 0, which is farthest from Level 7, converges to a greater degree compared to the result shown in FIG. 24. Here, the slope of the straight line for Level 7 with a higher degree of nonlinearity was used as the representative value. However, the slope for a level in the middle, such as Level 3 or Level 4, may be selected as a representative value to be used as a correction value coefficient. Alternatively, the average of the slopes of eight straight lines I through P may be used as the correction value coefficient.

Referring to FIG. 6, a difference between the reference values (center values) of the respective distributions for adjacent levels decreases as the level increases. A method for correcting this problem will be described below.

The left column in FIG. 7 shows reproduced values corresponding to isolation marks for respective levels. In each isolation mark, both the preceding and subsequent cells have Level 0, and the center cell has a mark of its level. When the reproduced values on the left are corrected to be equally spaced values on the right, a correction curve $\{y=-0.7031x^2+2.0556x-0.3894\}$ is obtained. Here, x is a value to be corrected and y is a corrected value. The result shown in FIG. 8 is obtained when this correction curve is used to correct for the nonlinearity of the distributions in FIG. 6.

Figure 8:
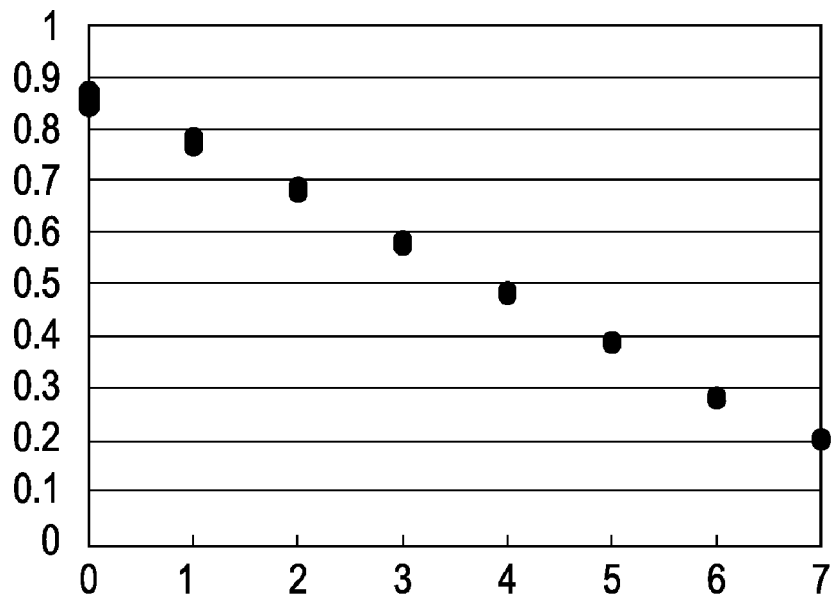
FIG. 8 shows the result of correction of nonlinearity according to the present invention.

As can be seen from FIG. 8, the reference values (center values) of their respective distributions are corrected to be equally spaced. After this correction is made, the absolute value of a difference between a sample value and a reference value is calculated for each level. Then, a sample value for a level corresponding to the smallest absolute value is selected as the final reproduced value. Here, the values of isolation marks are used for the correction of nonlinearity. However, as long as the relative location within the distribution is the same for all the levels, as in the case of the reference value, any other marks can be used.

Although ideal values have been used in the description above, system noise, recording noise, or the like may affect the sample values in practice, and the distributions shown in FIG. 6 and FIG. 8 may spread to some extent.

A series of correction steps involves the operation of bringing each sample value closer to the reference value of a reproduction level to be achieved. For reproduction, a difference between the corrected reference value and the corrected sample value is determined for each level. Then, a level corresponding to the smallest difference is selected as the reproduction level. Accurate multiple-valued reproduction can thus be achieved.

In FIG. 6, since the slope for Level 7 was selected as a representative value to be used as a correction value coefficient, the spread of the distribution increases with proximity to Level 0. Therefore, next, a correction method in which the slope for each level is used as a correction value coefficient will be described.

If S represents a sample value, a correction expression $[S+(Xs-7)b]$ is used similar to that described above. Here, b represents a slope for each level shown in FIG. 5.

Figure 9:
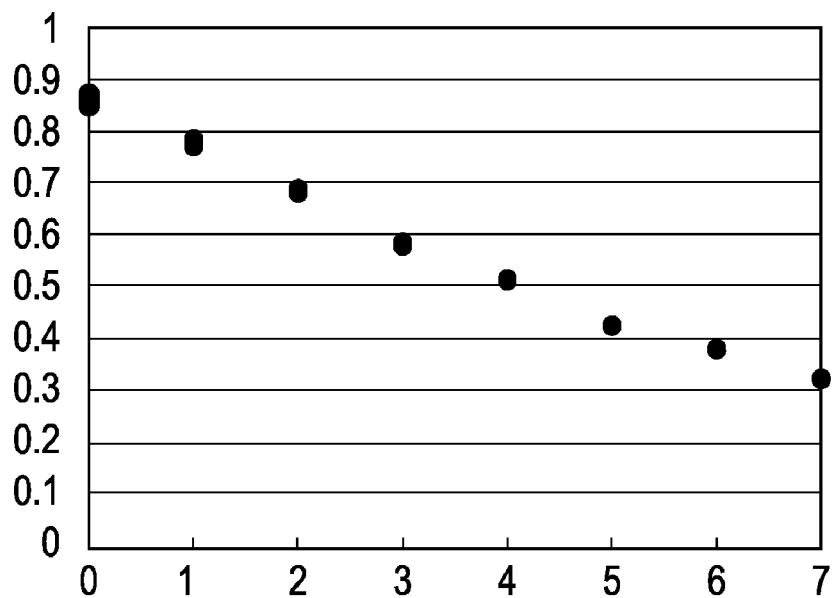
FIG. 9 shows the result of correction of effects of intersymbol interference using a slope for each level, according to another exemplary embodiment of the present invention.

The result of the correction is shown in FIG. 9. As can be seen, the distribution for every level converges to a single point. For the correction of nonlinearity as in the case of FIG. 8, when, in FIG. 10, corrected values corresponding to isolation marks for respective levels are used, a correction curve $\{y=-0.7551x^2+2.1435x-0.4295\}$ is obtained.

Figures 10, 11:
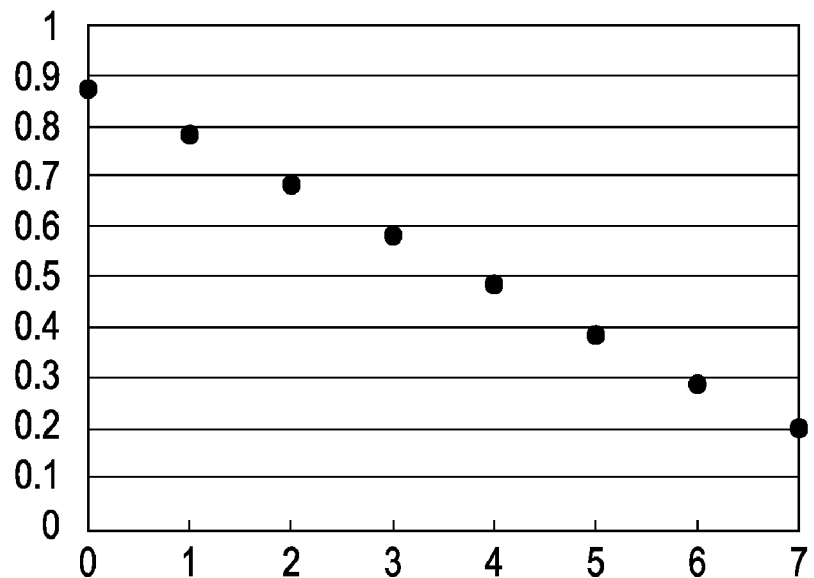
FIG. 10 shows corrected values used in correcting another type of nonlinearity according to the present invention.
FIG. 11 shows the result of correction of another type of nonlinearity according to the present invention.

FIG. 11 shows the distributions obtained after the final correction. As can be seen, the distribution for each level converges to almost a single point, and the reference values of their respective distributions are equally spaced. After this correction is made, the absolute value of a difference between a sample value and a reference value is calculated for each level. Then, a sample value for a level corresponding to the smallest absolute value is selected as the final reproduced value.

The correction performed on sample values for eliminating effects of intersymbol interference and nonlinearity has been described above. Next, the method for reproducing information by performing the correction will be described again with reference to the flowchart in FIG. 12. The slopes for individual levels are used in this correction method.

First, in step 1, the reproduction operation starts. In step 2, the distributions (i.e., pattern table) shown in FIG. 2 or FIG. 3 are obtained. In step 3, the slopes (b) and the reference values (t0, t1, . . . , t7) for respective levels (shown in FIG. 5) are obtained from the pattern table.

The method for obtaining the pattern table described above may be carried out in other ways. For example, together with relevant information, all patterns of three consecutive cells may be recorded as learning data on the optical disk such that they are read, for reproduction, to create a pattern table. Another possible method is to record the patterns of pattern tables obtained by simulations, and perform fitting by reproducing part of data recorded on the optical disk, and thus obtain a pattern table.

The process proceeds to step 4, where the reproduction of information starts, and sample values Sk are sequentially obtained. In step 5, the levels of the sequentially obtained sample values Sk are provisionally determined and stored in memory or the like. A possible method for the provisional determination is to calculate, with respect to each level, the absolute value of a difference between the reference value obtained in step 3 and the sample value Sk obtained in step 4 and select a level corresponding to the smallest absolute value as a provisional level. Alternatively, a difference between reference and sample values obtained from the known waveform equalization may be calculated for the provisional determination.

The process proceeds to step 6, where the effects of intersymbol interference are corrected with the correction expression $[Sk+(Xs-7)b]$. Here, Xs is the sum of the levels of the preceding and subsequent cells provisionally determined in step 5. As for the preceding cell, a level obtained after reproduction may be used. Also, a series of reproduction steps may be repeated. Here, since individual slopes for the respective eight levels are used, eight corrected values (Sk0, Sk1, . . . , and Sk7) are obtained for one sample value Sk. If a slope for one level is used as a representative value or the average of slopes for the eight levels is used, only a single corrected value is obtained.

The process proceeds to step 7, where nonlinearity is corrected. Here, a correction curve obtained from sample values for isolation marks (shown in FIG. 10) is used. The eight corrected values obtained in step 6 are further subjected to nonlinearity correction (Sk'0, Sk'1, . . . , and Sk'7 are obtained), and their respective reference values are corrected to be equally spaced (t'0, t'1, . . . , and t'7 are obtained).

In step 8, with respect to each level, the absolute value of a difference between a corrected value and a reference value |Sk'n−t'n| (where n ranges from 0 to 7) is calculated. Then in step 9, a corrected value for a level corresponding to the smallest absolute value is selected as a reproduced value.

The process proceeds to step 10, where it is determined whether to continue the process of information reproduction. For continuing, the process returns to step 4, from which the sequential steps of information reproduction are carried out. For termination, the process proceeds to step 11, where the operation of information reproduction ends.

In step 7, the correction of reference values for the second time and thereafter can be omitted, as these values are the same as before.

The above description refers to the case where eight levels are used. Generally, for "n" levels, a pattern table is obtained from reproduced signals for all combinations of "n" levels for three consecutive cells. Then, corrected values obtained from the pattern table are corrected with the amount of correction according to the sum of the levels of the preceding and subsequent cells, such that the reproduction signal of the center cell becomes closer to a reference value corresponding to the level of the center cell. This correction reduces the effects of intersymbol interference. By using corrected values according to the respective levels, nonlinearity can also be corrected.

Moreover, by correcting the reference values for the respective levels to be equally spaced, the nonlinearity can be corrected further.

Figure 12:
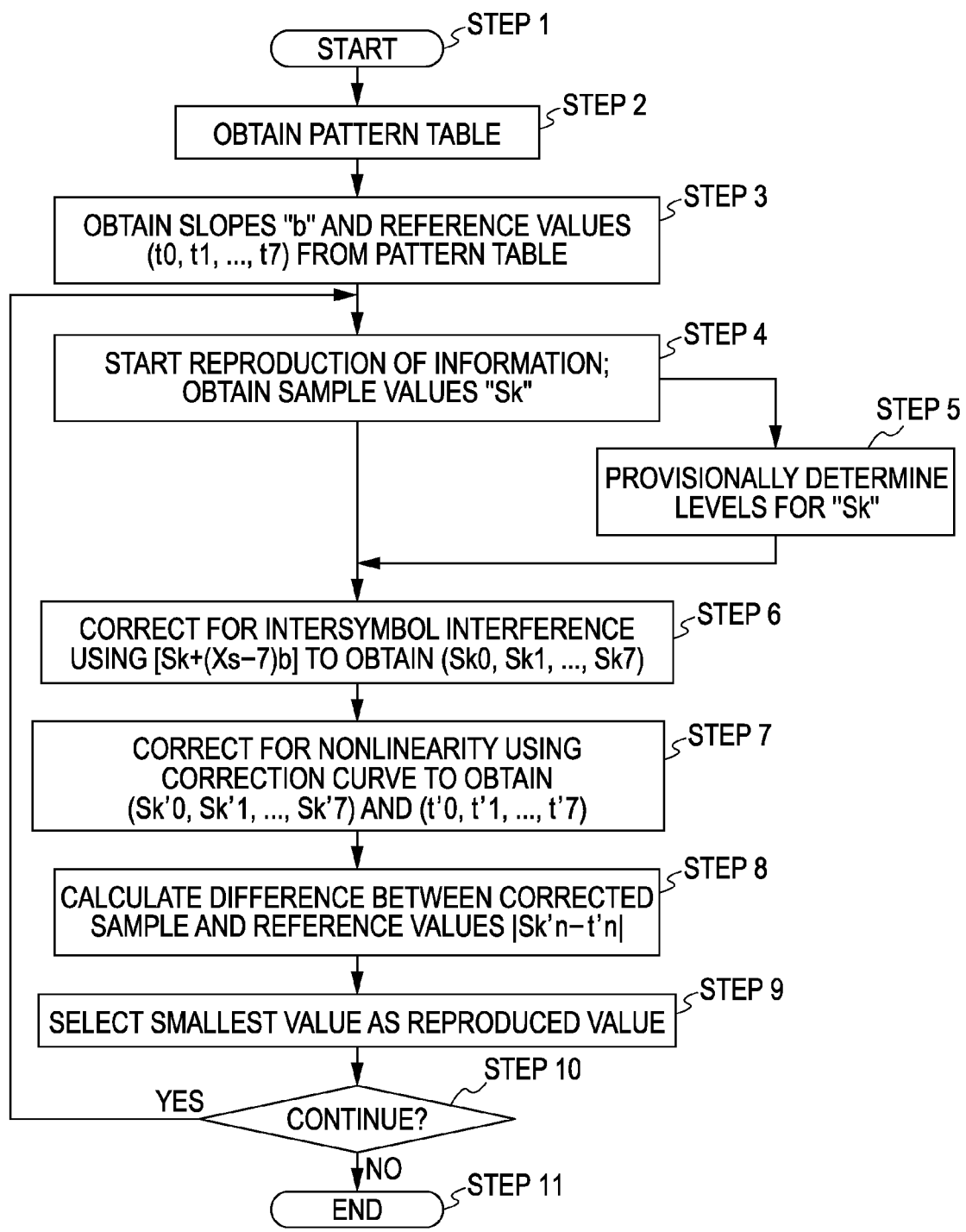
FIG. 12 is a flowchart showing the method of correction and reproduction according to the present invention.

FIG. 12 illustrates the method in which the levels of the preceding and subsequent cells are provisionally determined to perform correction. In this method, each sample value is expressed in any of "n" integers representing the "n" levels of the preceding and subsequent cells. However, the sample value may be expressed in analog form. For example, if a sample value between the reference values for Level 3 and Level 4 corresponds to the position of 0.35 when the difference between these reference values is normalized to one, the sample value is expressed in analog form, such as 3.35. Thus, the sum (Xs) of the levels of the preceding and subsequent cells may be determined in analog form to perform correction according to the expression [Sk+(Xs−7)b] in a similar manner to that described above.

When phase change materials are used as recordable/erasable recording materials, the resulting optical disk 4 is irradiated with the light spot 13, and the amount of light and the timing of recording pulses, erasing pulses, and cooling pulses are controlled. This allows the formation of various shapes of information pits with multiple reproduction levels. For convenience in explanation, the above description has referred to rectangular information pits with various widths in the track direction. However, the information pits may be circular, elliptical, or arrowheaded in shape, as long as they have appropriate areas corresponding to their respective levels.

In addition to the phase change materials described above, magneto-optical materials may also be used as recordable/erasable recording materials for the production of the optical disk. In this case, in the optical information recording/reproducing apparatus described above, the light spot acts in cooperation with a magnetic field from a magnetic head (not shown) so as to form various shapes of information pits with multiple reproduction levels.

Moreover, it is also possible to use write-once recording materials, such as organic dyes and metal thin films. Again, the optical disk is irradiated with a light spot, and the amount of recording light and the timing of recording pulses are controlled. This allows the formation of various shapes of information pits with multiple reproduction levels. As for a read-only recording medium, information pits called phase pits are provided to form an uneven surface of the substrate of the medium. Multiple-valued recording can be performed by modulating the areas or optical depths of the phase pits.

To determine the slopes of the respective straight lines in FIG. 3, it is not necessary to use all the combinations of the levels of the preceding and subsequent cells (i.e., for eight levels, 8×8×8=512 combinations in total). Specifically, the slope of a straight line can be determined by obtaining two or more possible reproduced signal values of the center cell with respect to the sum of the levels of the preceding and subsequent cells.

This allows learning with a small area and facilitates the efficient use of the recording medium. Moreover, since the number of marks to be referred to is reduced, the time required for learning can also be reduced.

This will be described in detail in relation to the method for determining the distributions illustrated in FIG. 13.

Figure 13:
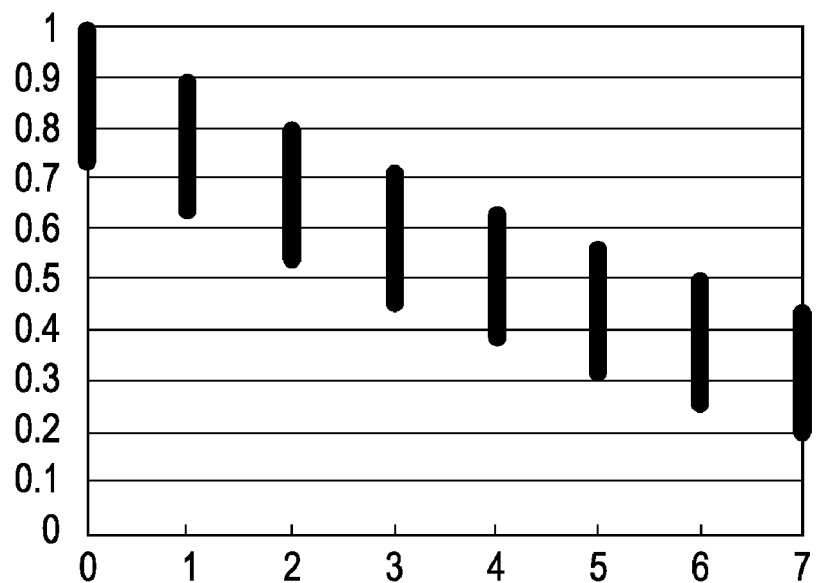
FIG. 13 is a graph showing the amplitude distributions of cell center values under optical parameters used in the optical information recording/reproducing apparatus illustrated in FIG. 1, and having the horizontal axis representing the level of a center cell.
Figure 14:
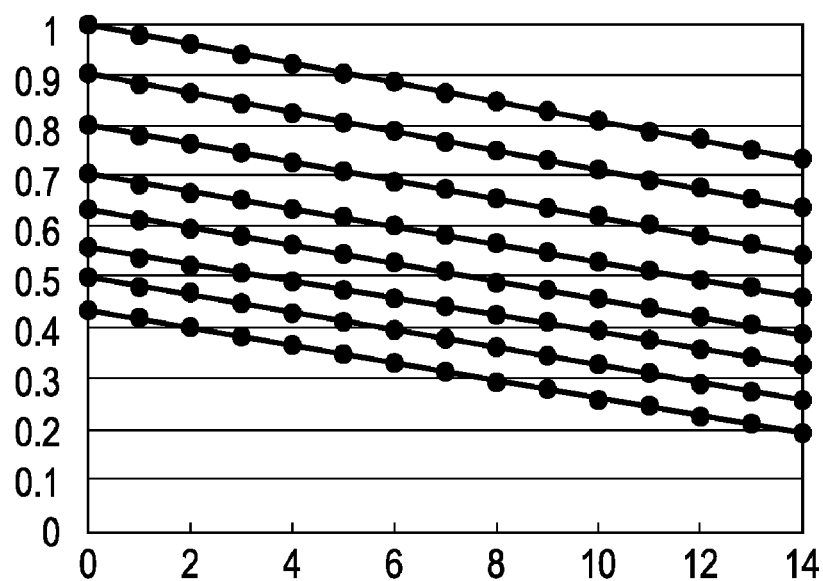
FIG. 14 is a graph showing the amplitude distributions of cell center values under optical parameters used in the optical information recording/reproducing apparatus illustrated in FIG. 1, and having the horizontal axis representing the sum of the levels of preceding and subsequent cells.

FIG. 14 is another representation of the distributions shown in FIG. 13. The horizontal axis represents the sum of the levels of the preceding and subsequent cells, instead of the level of the center cell. The eight distributions in FIG. 13 are expressed in the form of eight straight lines in FIG. 14.

It can be seen from FIG. 14 that each of the eight straight lines can be defined by specifying two sample points. That is, if at least two sample points can be determined for each level, a straight line can be defined.

For example, sample points obtained when the sum of the levels of the preceding and subsequent cells is "0" and "14" are used.

When the sum of the levels of the preceding and subsequent cells is "0", sample data sets are isolation marks for respective levels as follows: {00000}, {00100}, {00200}, {00300}, {00400}, {00500}, {00600}, and {00700}. As can be seen, in each of these isolation marks, a mark corresponding to its level is isolated in the middle of a plurality of "0" on both sides. Here, these isolation marks are referred to as a "first mark group".

When the sum of the levels of the preceding and subsequent cells is "14", sample data sets are reverse isolation marks for respective levels as follows: {77077}, {77177}, {77277}, {77377}, {77477}, {77577}, {77677}, and {77777}. As can be seen, in each of these isolation marks, a mark corresponding to its level is isolated in the middle of a plurality of "7" on both sides. Here, these reverse isolation marks are referred to as a "second mark group".

The first and second mark groups are recorded once or more than once when information is written to an optical disk.

The first mark group may be recorded either before or after the second mark group is recorded. Alternatively, marks of the first and second mark groups may be alternately recorded.

In this case, reference marks obtained are as follows: {00000}, {77777}, {00100}, {77677}, {00200}, {77577}, {00300}, {77477}, {00400}, {77377}, {00500}, {77277}, {00600}, {77177}, {00700}, and {77077}.

Figure 15A:
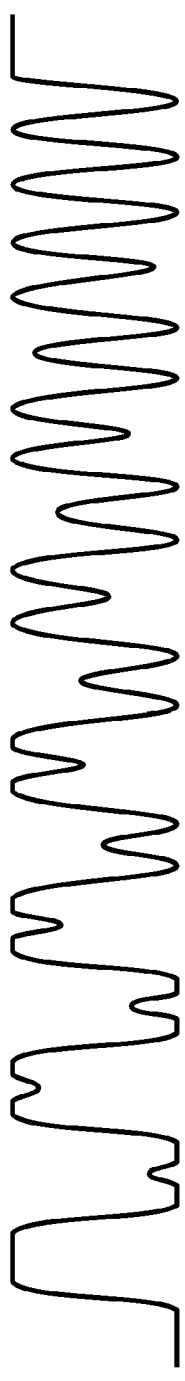
Figure 15B:

FIG. 15A shows a reproduced signal corresponding to these reference marks, FIG. 15B shows sample points used as learning data, and FIG. 15C shows the levels of the reference marks actually recorded.

When the marks of the first and second mark groups are alternately recorded, the direct current (DC) levels of the reproduced signal are equalized and there is less impact on the signal reproduction and a servomotor, compared to the case where the first mark group and the second mark group are separately recorded. Additionally, at each boundary between a mark of the first mark group and a mark of the second mark group, that is, at each boundary between Level 0 and Level 7, an edge of the maximum amplitude can be obtained. Therefore, these learning marks can also be used as preambles for generating clocks for data reproduction. With such a configuration, learning can be performed without degrading format efficiency.

The values of the reproduced signal in FIG. 15A are obtained at the sample points in FIG. 15B and shown in FIG.

16, where values corresponding to the marks of the first mark group are represented by filled circles, and values corresponding to the marks of the second mark group are represented by open circles. By connecting these filled circles and their corresponding open circles, learning distributions equivalent to those shown in FIG. 14 can be obtained.

In the known method, as described above, reference marks for all the combinations of the levels of three consecutive cells (i.e., for eight levels, 8×8×8=512 combinations in total) are recorded and reproduced to perform learning. However, if the reference marks for the first and second mark groups (i.e., for eight levels, 8×2=16 reference marks in total) are recorded and reproduced, learning that is equivalent to that in the known method can be performed.

Figure 16:
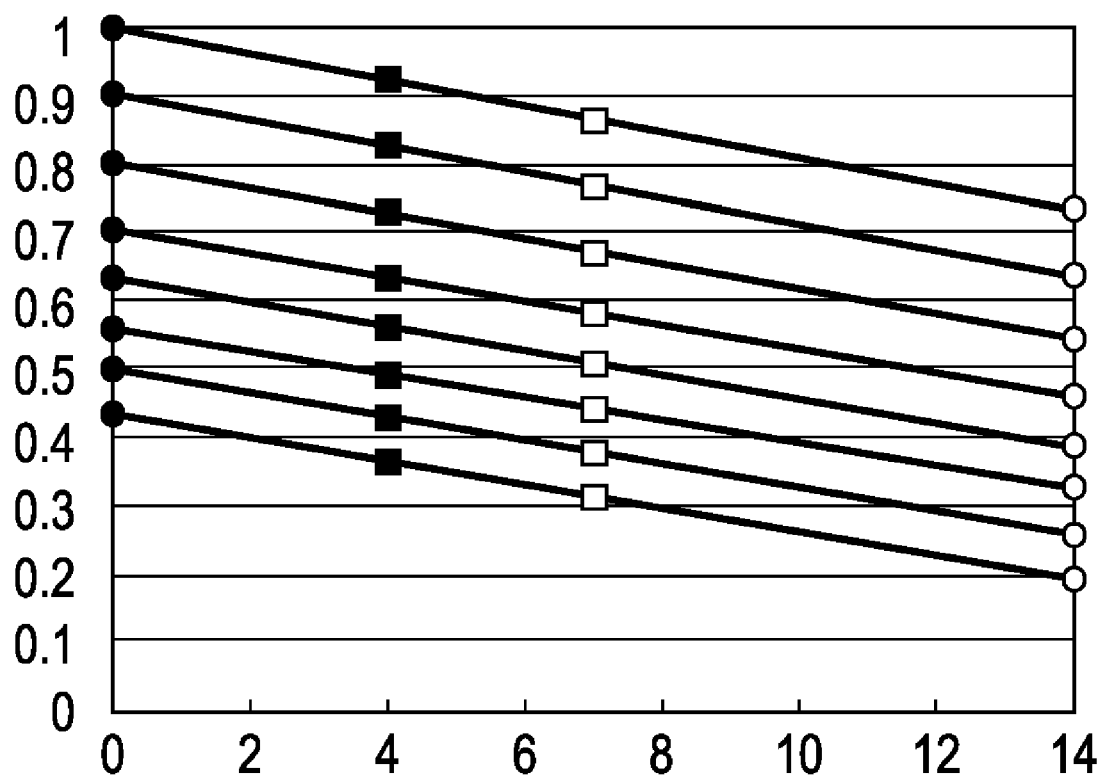
FIG. 16 illustrates a method for obtaining learning data from the reproduced signal corresponding to the reference marks according to the present invention.

In other words, if the pattern table in FIG. 16 is determined, a sample value for the combination of the levels of three consecutive cells can be determined. The eight straight lines in FIG. 16 correspond to the respective levels (from the top, Level 0, Level 1, Level 2, ... , and Level 7) of the center cell of the three consecutive cells. For example, if the combination of the levels of the three consecutive cells is (3,6,4), the sum of the levels of the preceding and subsequent cells is given by 3+4=7, and the level of the center cell is "6" corresponding to the seventh straight line from the top. Therefore, by finding the point of intersection between a vertical straight line at the position of "7" on the horizontal line and the seventh straight line from the top, the sample value for the combination (3,6,4) can be easily determined.

As for the numerical calculation, the straight line for Level 6 of the center cell can be expressed by the equation $y=-0.01686x+0.49051$, as the x and y coordinates of (0,6,0) and (7,6,7) are (0,0.49051) and (14,0.25448), respectively. Therefore, when the sum of the levels of the preceding and subsequent cells is 7, substituting 7 into x of this equation gives a sample value of $y=0.37291$.

As described above, sample values that have not yet been obtained can be easily determined from the obtained sample value by linear interpolation.

Moreover, if actually obtained learning information is not significantly different from the ideal learning information (i.e., determined by calculation) shown in FIG. 14, the learning method can be further simplified. In this case, since the relative positional relationships of the eight straight lines are unchanged, at least three different points on any of the straight lines are selected as reference marks, recorded, and reproduced. This can reduce or increase the amount of ideal learning information (i.e., determined by calculation) and fit the ideal learning information to the actually obtained learning information. For example, if the three points {77077}, {00000}, and {77777} are used as reference marks, the slope of the straight line for Level 0 can be determined by the two points {77077} and {00000}. This slope can also be used as the slope of the straight lines for the other levels. Also, the distance between the adjacent straight lines can be determined by using the value of the point {77777}.

The method for easily obtaining a pattern table used in reproducing multilevel information has been described so far. Next, an exemplary method for reproducing multilevel information by using the obtained pattern table in FIG. 16 will be described.

First, in the learning data in FIG. 16, a reference value for each level (from Level 0 to Level 7) is determined. Here, values with an x coordinate of 7 (which represents the sum of the levels of the preceding and subsequent cells) are determined to be reference values (indicated by open squares in FIG. 16).

After random multilevel information is read out, a sample value for each cell is detected and normalized by the reflectance of marked and unmarked portions. Then, the difference between the normalized value and the reference value is determined for each level. A level corresponding to the smallest difference value is determined to be a provisional level. This provisional determination is made before the actual determination of multilevel information is made.

For the actual determination of multilevel information, the sum of the provisionally determined levels of the preceding and subsequent cells of the target cell (center cell) is determined. If, for example, the sum is 4, values with an x coordinate of 4 (indicated by filled squares in FIG. 16) are determined to be reference values for actual determination. Then, the difference between the newly determined reference value and the sample value is determined for each level. A level corresponding to the smallest difference value is selected as a reproduction level. This series of operations is repeated to reproduce multilevel information.

The provisional determination may be made after processing, such as waveform equalization, is performed on the learning data in FIG. 16. Also, correction processing equivalent to the waveform equalization may be performed by using a coefficient obtained from the learning data in FIG. 16.

As described above, the present invention can reduce the effects of intersymbol interference in multilevel information, enhance the separation of distributions of reproduced signals, and thus improve the accuracy of reproduction.

Moreover, in reproducing multilevel information, since the number of reference marks required for determining a coefficient for the correction of reproduced signals can be reduced, the format efficiency is not degraded and the amount of time involved in learning operation can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-251659 filed Aug. 31, 2005 and No. 2005-253542 filed Sep. 1, 2005, which are hereby incorporated by reference herein in their entirety.

What is claimed is:

1. An optical information recording/reproducing method for recording n-level multilevel information on an optical information recording medium with a track by forming information pits of various areas or various widths in the track direction so as to cause a reproduced signal having a multilevel amplitude to be generated, the information pits being formed on respective cells of the same width virtually provided on the track, and/or reproducing the n-level multilevel information from the optical information recording medium, the method comprising the steps of:

obtaining in advance, in three consecutive cells consisting of a preceding cell, a center cell, and a subsequent cell, a possible change rate of an amplitude of the reproduced signal for the center cell with respect to a sum of multiple values of the preceding and subsequent cells;

obtaining the sum of multiple values of adjacent preceding and subsequent cells with respect to each cell for reproduction;

correcting the amplitude of the reproduced signal obtained at the center cell to be closer to a reference value on the basis of the obtained change rate and sum; and reproducing the multilevel information on the basis of the corrected amplitude of the reproduced signal.

2. The optical information recording/reproducing method according to claim 1, wherein the change rate of the amplitude of the reproduced signal is obtained for each level of the center cell.

3. The optical information recording/reproducing method according to claim 2, wherein the change rate of the amplitude of the reproduced signal to be used is one selected from the change rates obtained for respective levels of the center cell.

4. The optical information recording/reproducing method according to claim 1, wherein the reference value is the amplitude of the reproduced signal for the center cell, the amplitude being obtained in advance with respect to any value selected from the sums of the multiple values of the preceding and subsequent cells.

5. The optical information recording/reproducing method according to claim 1, further comprising the step of correcting the reference values for the respective levels to be equally spaced.

6. The optical information recording/reproducing method according to claim 5, further comprising the step of correcting the amplitude of the reproduced signal to be closer to the corrected reference value with respect to each level.

7. The optical information recording/reproducing method according to claim 1, wherein the step of obtaining the change rate comprises the steps of:

obtaining two or more possible amplitudes of the reproduced signal for the center cell with respect to each level of the center cell; and calculating the change rate of a not-yet-obtained amplitude of the reproduced signal by linear interpolation based on the obtained amplitudes of the reproduced signal.

8. The optical information recording/reproducing method according to claim 7, wherein the preceding and subsequent cells have a same level to cause a mark of the center cell to be isolated.

9. The optical information recording/reproducing method according to claim 8, wherein the same level is the lowest level or the highest level.

* * * * *